(12) United States Patent
Lin et al.

(10) Patent No.: US 8,593,504 B2
(45) Date of Patent: Nov. 26, 2013

(54) CHANGING BANDWIDTH USAGE BASED ON USER EVENTS

(75) Inventors: Lin Lin, Belleville (CA); Moni Manor, Mountain View, CA (US); Gregory T. Osterhout, Coppell, TX (US); Stephen R. Whynot, Allen, TX (US)

(73) Assignee: Avaya Inc., Basking Ridge, NJ (US)

( * ) Notice: Subject to any disclaimer, the term of this patent is extended or adjusted under 35 U.S.C. 154(b) by 359 days.

(21) Appl. No.: 13/025,536

(22) Filed: Feb. 11, 2011

(65) Prior Publication Data

US 2012/0206559 A1     Aug. 16, 2012

(51) Int. Cl.
H04N 7/14         (2006.01)
H04L 12/28        (2006.01)
H04Q 11/04        (2006.01)

(52) U.S. Cl.
USPC ... 348/14.08; 345/2.2; 348/14.03; 348/14.09; 348/14.1; 348/14.12; 370/230; 370/232; 370/254; 370/260; 372/33; 375/240.04; 375/240.26; 709/204; 709/226; 725/150

(58) Field of Classification Search
USPC ......... 345/2.2; 348/14.03, 14.08, 14.1, 14.12, 348/14.02, 14.09; 370/230, 232, 254, 260; 372/33; 375/240.04, 240.26; 709/226, 709/204; 725/150

See application file for complete search history.

(56) References Cited

U.S. PATENT DOCUMENTS

| | | | | |
|---|---|---|---|---|
| 5,742,772 A * | 4/1998 | Sreenan | ........................ | 709/226 |
| 6,025,870 A * | 2/2000 | Hardy | .......................... | 348/14.1 |
| 6,665,264 B1 * | 12/2003 | Davison et al. | ................ | 370/230 |
| 6,775,247 B1 * | 8/2004 | Shaffer et al. | ................. | 370/260 |
| 6,922,718 B2 * | 7/2005 | Chang | ........................... | 709/204 |
| 7,007,098 B1 | 2/2006 | Smyth et al. | | |
| 7,212,174 B2 * | 5/2007 | Johnston et al. | ............... | 345/2.2 |
| 7,313,593 B1 * | 12/2007 | Pulito et al. | .................... | 709/204 |
| 7,362,349 B2 * | 4/2008 | Nelson et al. | .............. | 348/14.08 |
| 7,729,299 B2 * | 6/2010 | Eisenberg et al. | ............ | 370/260 |
| 7,782,940 B2 * | 8/2010 | Shah et al. | ................ | 375/240.04 |
| 7,929,012 B2 * | 4/2011 | Fry et al. | ..................... | 348/14.09 |
| 8,005,017 B2 * | 8/2011 | Guan | ............................ | 370/254 |
| 8,081,205 B2 * | 12/2011 | Baird et al. | ................ | 348/14.08 |
| 8,233,026 B2 * | 7/2012 | Sylvain | ....................... | 348/14.08 |
| 8,271,651 B1 * | 9/2012 | Wang et al. | .................... | 709/226 |
| 8,310,520 B2 * | 11/2012 | Gopal et al. | ............... | 348/14.08 |
| 8,330,794 B2 * | 12/2012 | Ramanathan et al. | ..... | 348/14.09 |
| 2004/0158878 A1 * | 8/2004 | Ratnakar et al. | .............. | 725/150 |
| 2008/0310468 A1 * | 12/2008 | Nagashima | ..................... | 372/33 |
| 2010/0026781 A1 * | 2/2010 | Ali et al. | .................. | 348/14.08 |
| 2011/0032324 A1 * | 2/2011 | George et al. | .............. | 348/14.12 |
| 2011/0058473 A1 * | 3/2011 | Krym et al. | .................... | 370/232 |
| 2011/0085017 A1 * | 4/2011 | Robinson et al. | .......... | 348/14.08 |
| 2011/0194619 A1 * | 8/2011 | Yu | .............................. | 375/240.26 |
| 2012/0062687 A1 * | 3/2012 | Sai et al. | .................... | 348/14.03 |
| 2012/0206559 A1 * | 8/2012 | Lin et al. | .................... | 348/14.08 |
| 2012/0242776 A1 * | 9/2012 | Tucker et al. | .............. | 348/14.03 |

* cited by examiner

Primary Examiner — Gerald Gauthier

(57) ABSTRACT

Once an active video conference is set up and a user is viewing the active video conference at a video terminal, the video terminal looks for different events that indicate a change in focus of the user to or from the active video conference. For example, the user brings up another application and starts using the application or the user has minimized a window that is displaying the active video conference. The video terminal sends a change of focus message based on the event to a video conference bridge or another video terminal that is streaming the active video conference to the user. The video conference bridge/video terminal processes the message and changes video portion of the stream of the active video conference based on the message. The result is that there is improved use of bandwidth between the video terminal and the video conference bridge/video terminal.

20 Claims, 6 Drawing Sheets

CHANGING BANDWIDTH USAGE BASED ON USER EVENTS

TECHNICAL FIELD

The system and method relates to video conferencing systems and in particular to bandwidth management in video conferencing systems.

BACKGROUND

In today's market, the use of video services, such as video conferencing, is experiencing a dramatic increase. Since video services require a significantly larger amount of bandwidth compared to audio services, this has caused increased pressure on existing communication systems to provide the necessary bandwidth for video communications. Because of the higher bandwidth requirements of video, users are constantly looking for products and services that can provide the required video services while still providing lower costs. One way to do this is to provide solutions that reduce and/or optimize the bandwidth used by video services.

Typical work in the field focused on optimizing the codec used in bandwidth reduction. A lot of work has been done in the industry to improve the conference experience based on network with non-quality links or for busy networks.

SUMMARY

The system and method are directed to solving these and other problems and disadvantages of the prior art. These ideas focus on the activities in the video terminal and, in collaboration with the video bridge, they reduce the actual bandwidth used for the video call (even if on a temporary basis). Once an active video conference is set up and a user is viewing the active video conference at a video terminal, the video terminal looks for different events that indicate an opportunity to reduce bandwidth. For example, the user brings up another application and starts using an application that covers the video window, or the user has minimized a window that is displaying the active video conference. The video terminal sends a change of focus (i.e., visibility) message based on the event to a video conference bridge/router that is streaming the active video conference to the user. The video conference bridge processes the message and changes the video portion of the stream of the active video conference based on the message. The result is that there is improved use of bandwidth between the video terminal and the video conference bridge.

Other embodiments look for other events such as power usage on devices such as laptop computers. If a change of a power threshold is met, a threshold message is sent to the video conference bridge and the video portion of the stream of the active video conference is changed. In addition, the system can look for different ways other applications are being used during the active video conference. For example, a user may bring up another application and start or stop using that application for a period of time. Based on the use, the system can change the video resolution. Other embodiments look at the gaze of the user to determine whether to change the video resolution.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Some embodiments will be illustrated below in conjunction with an exemplary video communication system. Although well suited for use with, e.g., a system using switch(es), server(s) and/or database(s), communications endpoints, etc., the embodiments are not limited to use with any particular type of video communication system or configuration of system elements. Those skilled in the art will recognize that the disclosed techniques may be used in any video communication application in which it is desirable to provide enhanced bandwidth management.

Figure 1A:
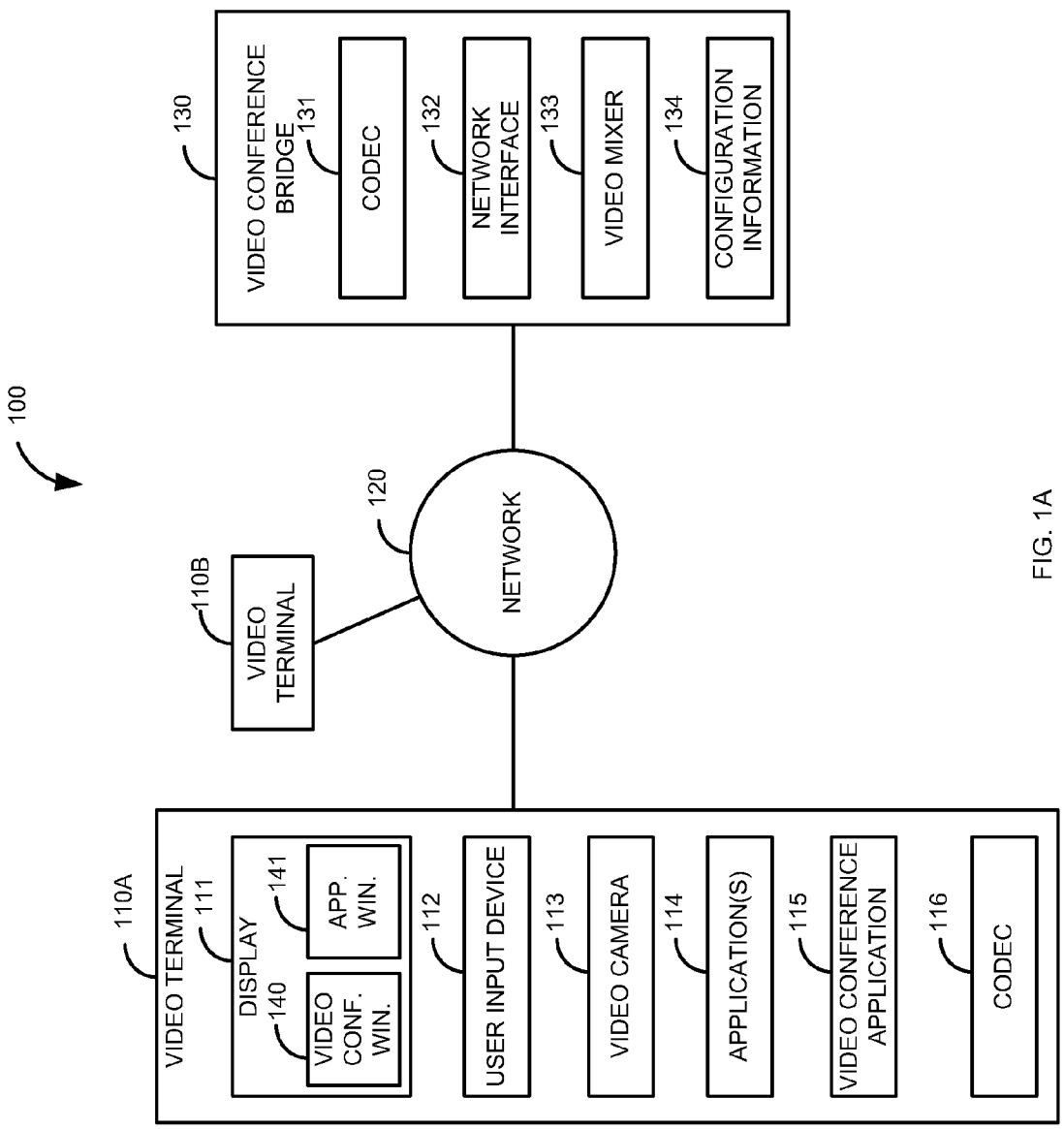
FIG. 1A is a block diagram of a first illustrative system for detecting a change of focus by a user and changing the stream of an active video conference based on the change of focus.

FIG. 1A is a block diagram of a first illustrative system 100 for detecting a change of focus by a user and changing the stream of an active video conference based on the change of focus. First illustrative system 100 comprises video terminals 110A-110B, network 120, and video conference bridge 130. Video terminal 110 can be any type of communication device that can display a video stream, such as a telephone, a cellular telephone, a Personal Computer (PC), a Personal Digital Assistant (PDA), a monitor, a television, a conference room video system, and the like. Video terminal 110 further comprises a display 111, a user input device 112, a video camera 113, application(s) 114, video conference application 115 and codec 116. In FIG. 1A, video terminal 110 is shown as a single device; however, video terminal 110A can be distributed between multiple devices. For example, video terminal 110 can be distributed between a telephone and a personal computer.

Display 111 can be any type of display such as a Liquid Crystal Display (LCD), a Cathode Ray Tube (CRT), a monitor, a television, and the like. Display 111 is shown further comprising video conference window 140 and application window 141. Video conference window 140 comprises a display of the stream(s) of the active video conference. The stream(s) of the active video conference typically comprises an audio portion and a video portion. Application window 141 is one or more windows of an application 114 (e.g., a window of an email program). Video conference window 140 and application window 141 can be displayed separately or at the same time. User input device 112 can be any type of device that allows a user to provide input to video terminal 110, such as a keyboard, a mouse, a touch screen, a track ball, a touch pad, a switch, a button, and the like. Video camera 113 can be any type of video camera, such as an embedded camera in a PC, a separate video camera, an array of cameras, and the like. Application(s) 114 can be any type of application, such as an email program, an Instant Messaging (IM) program, a word processor, a spread sheet, a telephone application, and the like. Video conference application 115 is an application that processes various types of video communications, such as a codec 116, a video conferencing software/software, and the like. Codec 116 can be any hardware/software that can decode/encode a video stream. Elements 111-116 are shown as part of video terminal 110A. Likewise, video terminal 110B can have the same elements or a subset of elements 111-116.

Network 120 can be any type of network that can handle video traffic, such as the Internet, a Wide Area Network (WAN), a Local Area Network (LAN), the Public Switched Telephone Network (PSTN), a cellular network, an Integrated Digital Services Network (ISDN), and the like. Network 120 can be a combination of any of the aforementioned networks. In this exemplary embodiment, network 120 is shown connecting video terminals 110A-110B to video conference bridge 130. However, video terminal 110A and/or 110B can be directly connected to video conference bridge 130. Likewise, additional video terminals (not shown) can also be connected to network 120 to make up larger video conferences.

Video conference bridge 130 can be any device/software that can provide video services, such as a video server, a Private Branch Exchange (PBX), a switch, a network server, and the like. Video conference bridge 130 can bridge/mix video streams of an active video conference. Video conference bridge 130 is shown external to network 120; however, video conference bridge 120 can be part of network 120. Video conference bridge 130 further comprises codec 131, network interface 132, video mixer 133, and configuration information 134. Video conference bridge 130 is shown comprising codec 131, network interface 132, video mixer 133, and configuration information 134 in a single device; however, each element in video conference bridge 130 can be distributed.

Codec 131 can be any hardware/software that can encode a video signal. For example codec 131 can encode one or more compression standards, such as H.264, H.263, VC-1, and the like. Codec 131 can encode video protocols at one or more levels of resolution. Network interface 132 can be any hardware/software that can provide access to network 120 such as a network interface card, a wireless network card (e.g., 802.11g), a cellular interface, a fiber optic network interface, a modem, a T1 interface, an ISDN interface, and the like. Video mixer 133 can be any hardware/software that can mix two or more video streams into a composite video stream, such as a video server. Configuration information 134 can be any information that can be used to determine how a stream of the video conference can be sent. For example, configuration information 134 can comprise information that defines under what conditions a specific video resolution will be sent in a stream of the video conference, when a video portion of the stream of the video conference will or will not be sent, when an audio portion of the stream of the video conference will or will not be sent, and the like. Configuration information 134 is shown in video conference bridge 130. However, configuration information 134 can reside in video terminal 110A.

After a video conference is set up (typically between two or more video terminals 110), video mixer 133 mixes the video streams of the video conference using known mixing techniques. For example, video camera 113 in video terminal 110A records the live image of a user (not shown) and sends a video stream to video conference bridge 130, which is then mixed (usually if there are more than two participants in the video conference) by video mixer 133. In addition, the video conference can also include non-video devices, such as a telephone (where a user only listens to the audio portion of the video conference). Network interface 132 sends the stream of the active video conference to the video terminals 110 in the video conference. For example, video terminal 110A receives the stream of the active video conference. Codec 116 decodes the video stream and the video stream is displayed by video conference application 115 in display 111 (in video conference window 140).

Video terminal 110A detects a change of focus by the user. A change of focus can be any event, interrupt, process, and the like that changes the focus of the user to and from the video conference being displayed in display 111. For example, assume video conference application 115 is displaying the active video conference in video conference window 140. In this example, video conference window 140 completely fills display 111. The user receives an email and is alerted to the email. The user then changes focus by clicking with a mouse (user input device 112) to display the email application 114 on top of the video conference window 140. The email application 114 is now in the forefront of display 111. In this example, the change of focus has changed from video conference window 140 to email application window (141).

Likewise, a change of focus can occur in the other direction. For example, if the user reads the email and then wants to view the full video conference, the user could minimize or close the email window (141) so that the video conference window 140 is all that is displayed. In this example, the focus has changed from email application window 141 to video conference window 140. A change of focus can occur in different ways, such as the video conference application 115 detecting that the video conference window was maximized, the video conference window 140 was selected (e.g., opening it up after it was minimized, clicking on the video conference window, and the like), the video conference window 140 was minimized, the video conference window was moved, the application 114 was closed, the application 114 was started, the application window 141 was resized, the application window 141 was moved, a button was clicked, a menu was selected, and the like. Another example can be that of a screen saver. If the user has left the room for an extended period of time, the change of focus will be the initiation of the screen saver. A message can be displayed to the user to override the screen saver so that he/she can continue watching the video conference. Likewise, termination of the screen saver can also be a change of focus.

Video terminal 110A detects the change of focus and sends to video conference bridge 130 a message based on the change of focus. The message that is sent can be implemented in various ways. The message can identify a specific type of focus that has changed. For example, the message could indicate that the focus has changed from video conference window 140 to application window 141, from application window 141 to video conference window 140, the user has resized application window 141 to cover part of video conference window 141, the user resized video conference window 140, the user has moved the video conference window 140, the user has moved the application window 141, the user has minimized video conference window 140 (also indicating the amount of resizing), the user has maximized video conference window 140, the user has selected from the menu bar to change the focus from application window 141, and the like. The message can contain an instruction to change the stream of the active video conference in one or more different ways. For instance, the instruction (based on configuration information 134 that resides in video terminal 110 (not shown)) can instruct codec 131 in the video conference bridge 130 to change the resolution of the video conference from 720p to 480p or to stop sending the video portion of the video conference to video terminal 110. Another option would be to only send keep-alive messages instead of sending the video portion of the video conference. The message can contain instructions that can cause codec 131 to change both the video portion of the video conference and the audio portion of the video conference.

Network interface 132 in video conference bridge 130 receives the message. Codec 131 changes the stream of the active video conference based on the message. For example, codec 131 can increase the resolution of the active video conference based on a message that indicates that the user has maximized video conference window 140. Based on the message, network interface 132 sends the changed stream of the active video conference to video terminal 110A. Video terminal 110A receives the changed stream of the active video conference. Video terminal 110A displays the changed stream of the active video conference in video conference window 140 via video conference application 115.

Figure 1B:
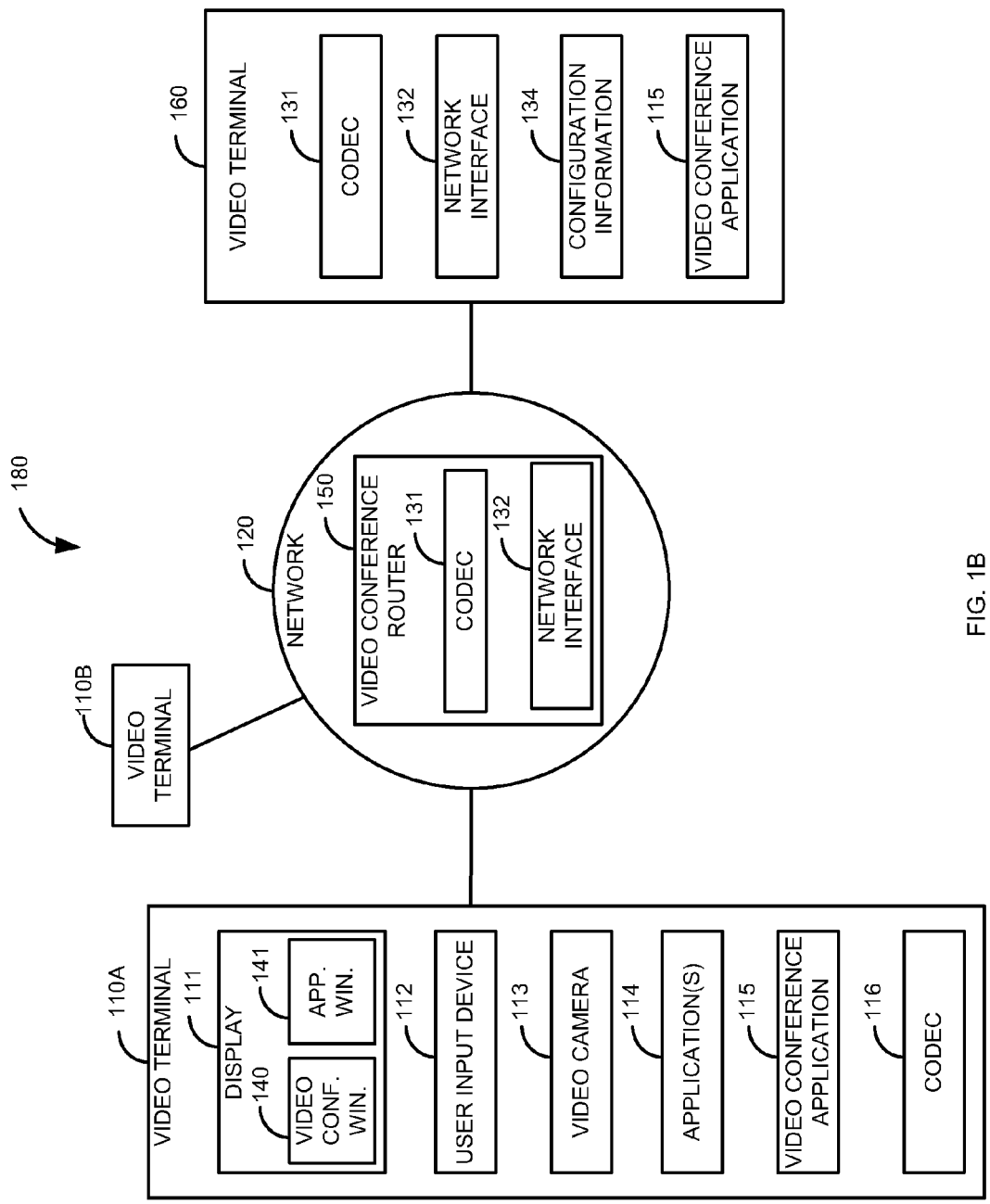
FIG. 1B is a block diagram of a second illustrative system for detecting a change of focus by a user and changing the stream of an active video conference based on the change of focus.

FIG. 1B is a block diagram of a second illustrative system 180 for detecting a change of focus by a user and changing the stream of an active video conference based on the change of focus. Second illustrative system 180 comprises video terminal 110A, video terminal 110B, video terminal 160, and network 120. Video terminal 110 further comprises display 111, user input device 112, video camera 113, application(s) 114, video conference application 115, and codec 116. Display 111 further comprises video conference window 140 and application window 141. Video terminal 160 comprises codec 131, network interface 132, configuration information 134, and video conference application 115. Configuration information 134 is shown in video terminal 160, but can also reside in video conference router 150. Although video terminal 160 is shown comprising different elements, video terminal 160 may be similar or identical to video terminal 110A.

Network 120 further comprises video conference router 150. Video conference router 150 further comprises codec 131 and network interface 132. Video conference router 150 routes video streams of a video conference. For example, if a video conference is occurring between video terminals 110A, 110B, and 160, video conference router 150 would route the video streams from video terminals 110A and 110B to video terminal 160. Video terminal 160 would then either mix the streams (sent from video terminals 110A and 110B) into a single stream for display or display the two streams to the user. Likewise, video conference router 150 would route video streams from video terminals 110A and 160 to video terminal 110B and video conference router 150 would route the video streams from video terminals 110B and 160 to video terminal 110A. Video terminals 110A and 110B would then mix the received streams for display or display the received streams to the user.

After a video conference is set up (e.g., between video terminals 110A, 110B, and 160), video conference bridge 150 routes the video streams of the active video conference. For example, video terminals 160 and 110B send their streams of the active video conference to video conference router 150, which routes the streams to video terminal 110A. Video terminal 110A receives the streams of the active video conference from video router 150. Codec 116 decodes the video streams and the video streams are displayed by conference application 115 in display 111 (in video conference window 140).

Video terminal 110A detects a change of focus by the user. Video terminal 110A sends to network interface 132 in video terminal 160 a message based on the change of focus. The change of focus message could also be sent to video terminal 110B if it supports similar functionality as video terminal 160. Network interface 132 in video terminal 160 receives the message. Codec 131 changes the stream of the active video conference based on the message. Network interface 132 sends the changed stream of the active video conference to video terminal 110A via video conference router 150. Video terminal 110A receives the changed stream of the active video conference. Video terminal 110A then displays the changed stream of the active video conference in video conference window 140 via video conference application 115.

In addition to or in place of network interface 132 in video terminal 160 receiving the change of focus message, network interface 132 in video conference router 150 can also receive the change of focus message and change the stream of the active video conference based on the change of focus message. For example, assume that a stream of the active video conference is sent from video terminal 160 to video terminal 110A via video conference router 150. This stream of the active video conference (sent by codec 131) is a multi-layered bit stream where each successive layer adds extra information (i.e., typically extra resolution) to the layer below it. In response to receiving the change of focus message, codec 131 in video conference router 150 can strip off one or more of the successive layers or add back one or more successive layers that video conference router 150 was previously stripping off. The result is an overall lower bandwidth bit stream sent to video terminal 110A.

Figure 2:
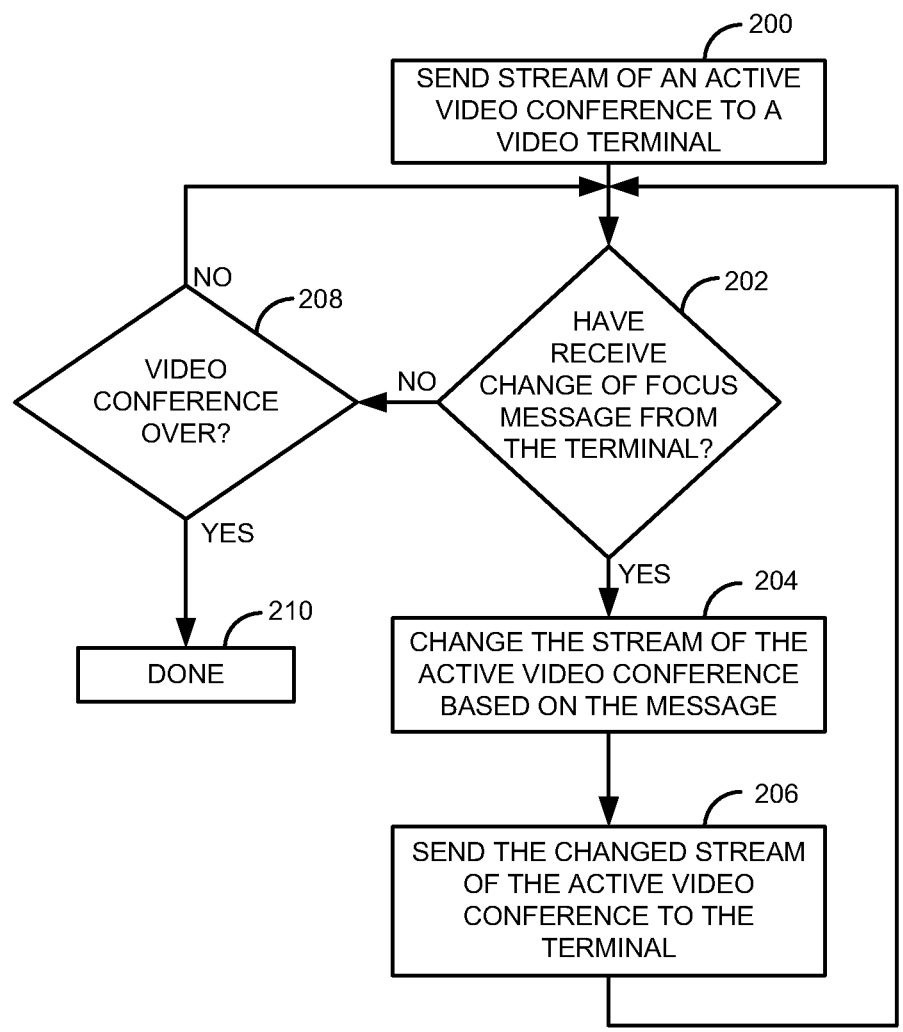
FIG. 2 is a flow diagram of a method for detecting a change of focus by a user and changing the stream of an active video conference based on the change of focus.

FIG. 2 is a flow diagram of a method for detecting a change of focus by a user and changing the stream of an active video conference based on the change of focus. The method described in FIG. 2 is shown from the prospective of video conference bridge 130 or video terminal 160. Illustratively, video terminal 110, video terminal 160, video conference router 150, and video conference bridge 130 are stored-program-controlled entities, such as a computer or processor, which performs the method of FIGS. 2-5 and the processes described herein by executing program instructions stored in a tangible computer readable storage medium, such as a memory or disk.

After the video conference is set up, network interface 132 sends 200 the stream of the active video conference to video terminal 110. Network interface 132 (in either video conference router 150 or video terminal 160) determines in step 202 if network interface 132 has received a change of focus message from video terminal 110. If network interface 132 has not received a change of focus message in step 202, video mixer 133/video terminal 160/video conference router 150 determines in step 208 if the active video conference is over. If the active video conference is over in step 208, the process is done 210. Otherwise, if the video conference is not over in step 208, the process goes back to step 202.

If network interface 132 in step 202 has received a change of focus message (sent by terminal 110 in step 310 in FIG. 3), codec 131 changes 204 the stream of the active video conference based on the change of focus message. Network interface 132 sends 206 the changed stream of the active video conference to terminal 110 and the process goes to step 202. In step 206, the changed stream is typically continuously sent until a different change of focus message is received in step 202 or the video conference is done in step 210.

Figure 3A:
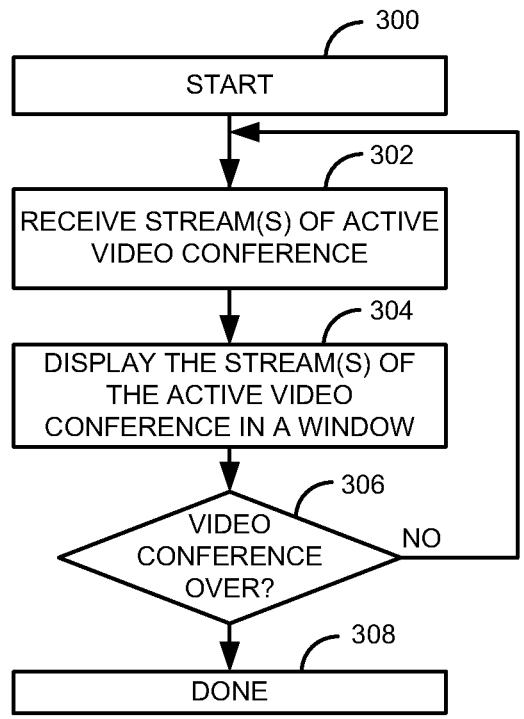
FIG. 3A is a flow diagram of a method for receiving and displaying the stream of an active video conference.

FIG. 3A is a flow diagram of a method for receiving and displaying the stream of an active video conference. The method described in FIG. 3A is shown from the perspective of video terminal 110. The process starts in step 300. Video terminal 110 receives 302 the stream(s) of the active video conference (sent in step 200 in FIG. 2). Video terminal 110 displays 304 the stream(s) of the active video conference in video conference window 140. The displayed stream(s) can be a composite stream sent from video conference bridge 130, one or more streams of the video conference, a stream that was mixed by video terminal 110, and the like. The process determines in step 306 if the active video conference is over. If the active video conference is over in step 306, the process is done 308. Otherwise, if the active video conference is not over in step 306, the process goes to step 302.

Figure 3B:
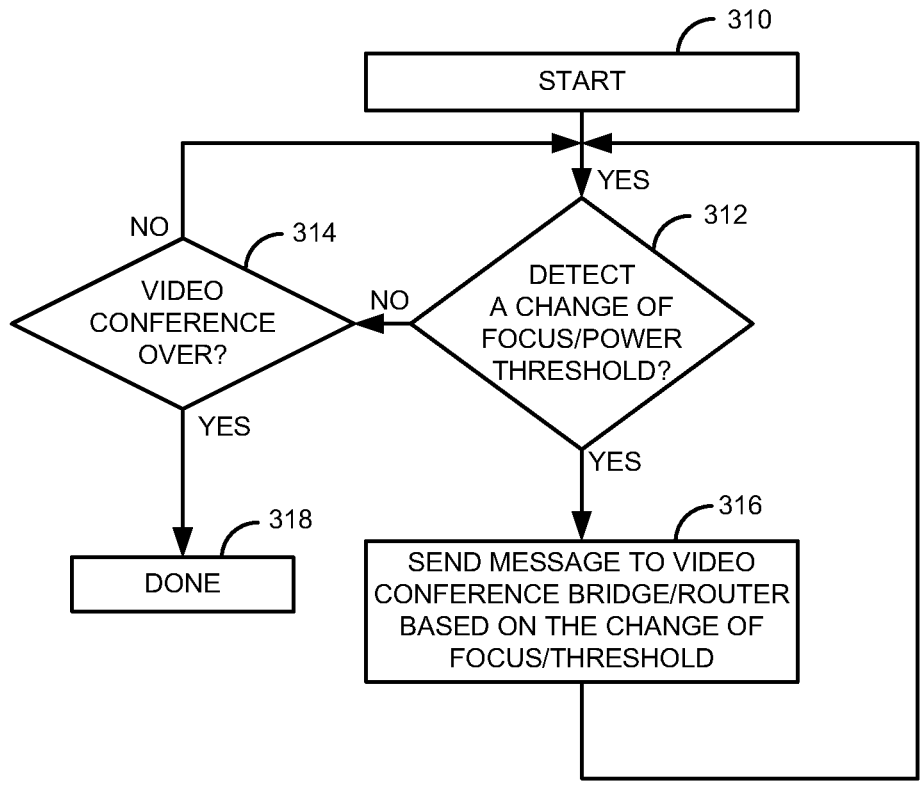
FIG. 3B is a flow diagram of a method for detecting a change of focus by a user.

FIG. 3B is a flow diagram of a method for detecting a change of focus by a user. The method described in FIG. 3B is shown from the perspective of video terminal 110. The process starts in step 310. Video terminal 110 determines in step 312 if there has been a change of focus or a change in a power threshold. A change in a power threshold is where a power level of video terminal 110 has moved above or below a defined threshold. For example, assume that video terminal 110 is a laptop computer that is running on a battery and that the threshold is when the battery is at 50% power. When the battery drops to 49% power, the laptop will detect the change below the threshold.

If video terminal 110 has not detected a change of focus/change in the power threshold in step 312, video terminal 110 determines in step 314 if the video conference is over. If video terminal 110 determines in step 314 that the video conference is over, the process is done 318. Otherwise, if video terminal 110 determines that the video conference is not over in step 314, the process goes back to step 312. If video terminal 110 has detected a change of focus/power threshold in step 312, video terminal 110 sends 316 a message to video conference bridge 130/video terminal 160 based on the change of focus/threshold. The process then goes to step 312.

Figure 4:
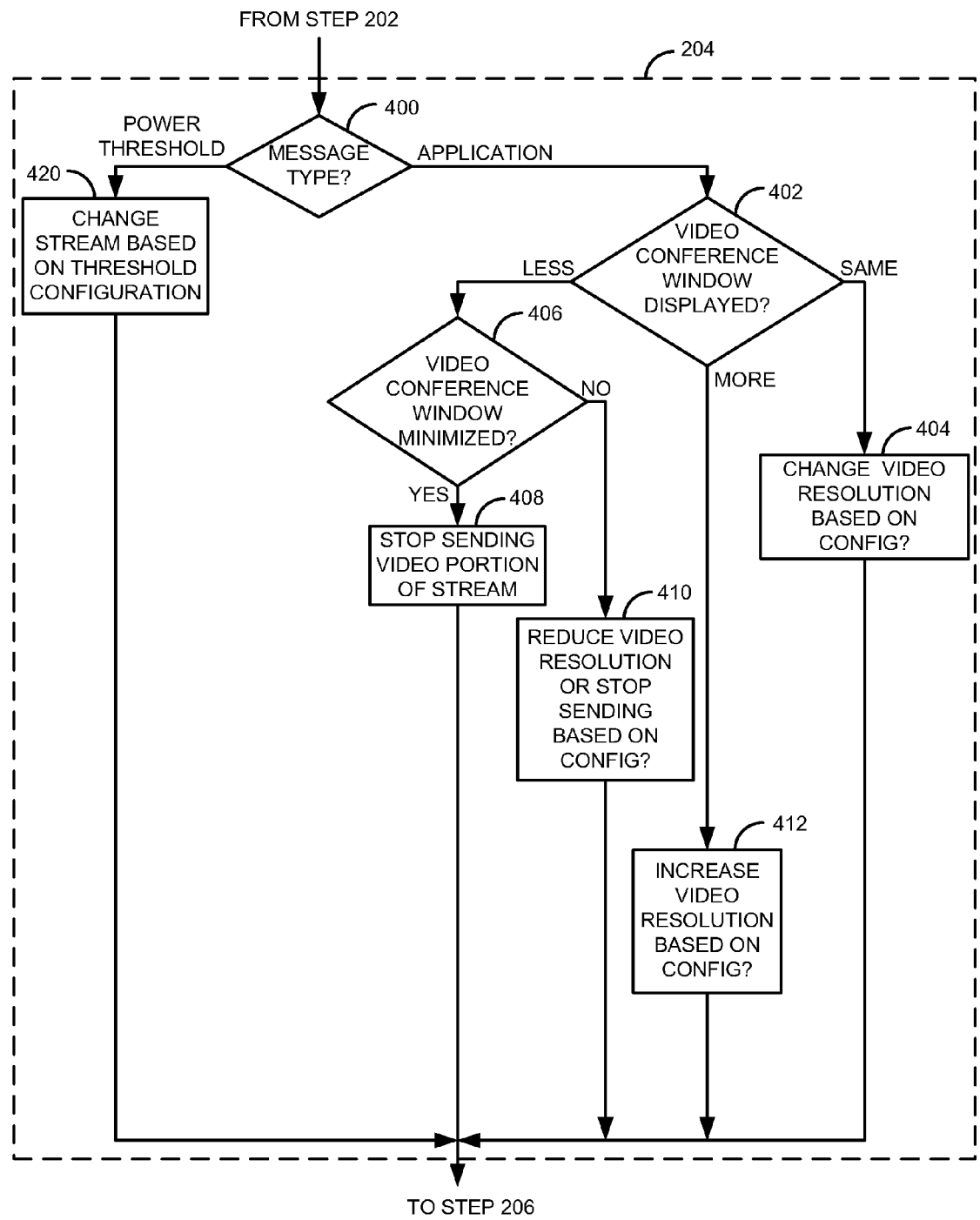
FIG. 4 is a flow diagram of a method for handling different message types.

FIG. 4 is a flow diagram of a method for handling different message types. FIG. 4 is an exemplary method of step 204 in FIG. 2. After receiving a message from video terminal 110 in step 202, codec 131 (in either video conference router 150 or video terminal 160) determines the message type in step 400. If the message type in step 400 is a change in power threshold, codec 131 changes 420 the stream of the active video conference based on configuration information 134 and the process goes to step 206. For example, assume that the message indicated a drop in power below 50% in a laptop (video terminal 110). Based on configuration information 134, codec 131 changes the resolution of the stream of the active video conference from 720p to 480p. This reduction in resolution results in lower power consumption in the laptop due to less processing of the stream of the active video conference. Likewise, if the change in threshold was that the laptop power threshold went above 50% (i.e., the laptop is now using a power supply), codec 131 can change the resolution of the stream of the active video conference from 480p to 720p.

If the message type in step 400 is an application message, the process determines how video conference window(s) 140 are displayed (relative to how video conference window 140 was previously displayed and/or how application window(s) 141 are displayed) to the user in step 402. If video conference window 140 is displayed less in step 402 (for example, the user opened application window 141 over a portion or all of video conference window 140 or video conference window 140 has been minimized), the process determines in step 406 if video conference window 140 has been minimized. If video conference window 140 has not been minimized in step 406, codec 131 can optionally reduce the video resolution, stop sending the video portion of the stream of the active video conference, send keep-alive messages instead of sending the video portion of the stream of the active video conference, and the like in step 410. For instance, codec 131 can reduce the video resolution of the stream of the active video conference, based on configuration information 134, if application window 141 covers most of video conference window 140. Codec 131 can, based on configuration information 134, stop sending in step 410, the video portion of the stream of the active video conference if application window 141 completely covers video conference window 140. Moreover, codec 131 may elect to leave the resolution of the stream of the active video conference at the current setting based on configuration information 134 in step 410; for example, if only a small percentage of video conference window 140 is covered by application window 141. After completing step 410, the process goes to step 206. If video conference window 140 has been minimized in step 406, codec 131 stops sending 408 the video portion of the stream of the active video conference and the process goes to step 206.

If video conference window 140 is displayed more (relative to how video conference window 140 was previously displayed and/or how application window 141 is displayed) in step 402, codec 131 can optionally increase in step 412 the resolution of the stream of the active video conference based on configuration information 134. For example, if the user has substantially increased the size of the video conference window 140 to cover most of application window 141. On the other hand, codec 131 may elect to not change the video resolution if the user has only minimally increased the size of video conference window 140. After completing step 412, the process goes to step 206.

If the displayed video conference window is the same in step 402 (for example, the user just selected (changed focus to) application window 141, but video conference window 140 is displayed the same to the user), codec 131 can optionally change 404 the video resolution based on configuration information 134. On the other hand, codec 131 may elect to not change the video resolution of the stream of the active video conference in step 404. Once step 404 is completed, the process goes to step 206.

Figure 5:
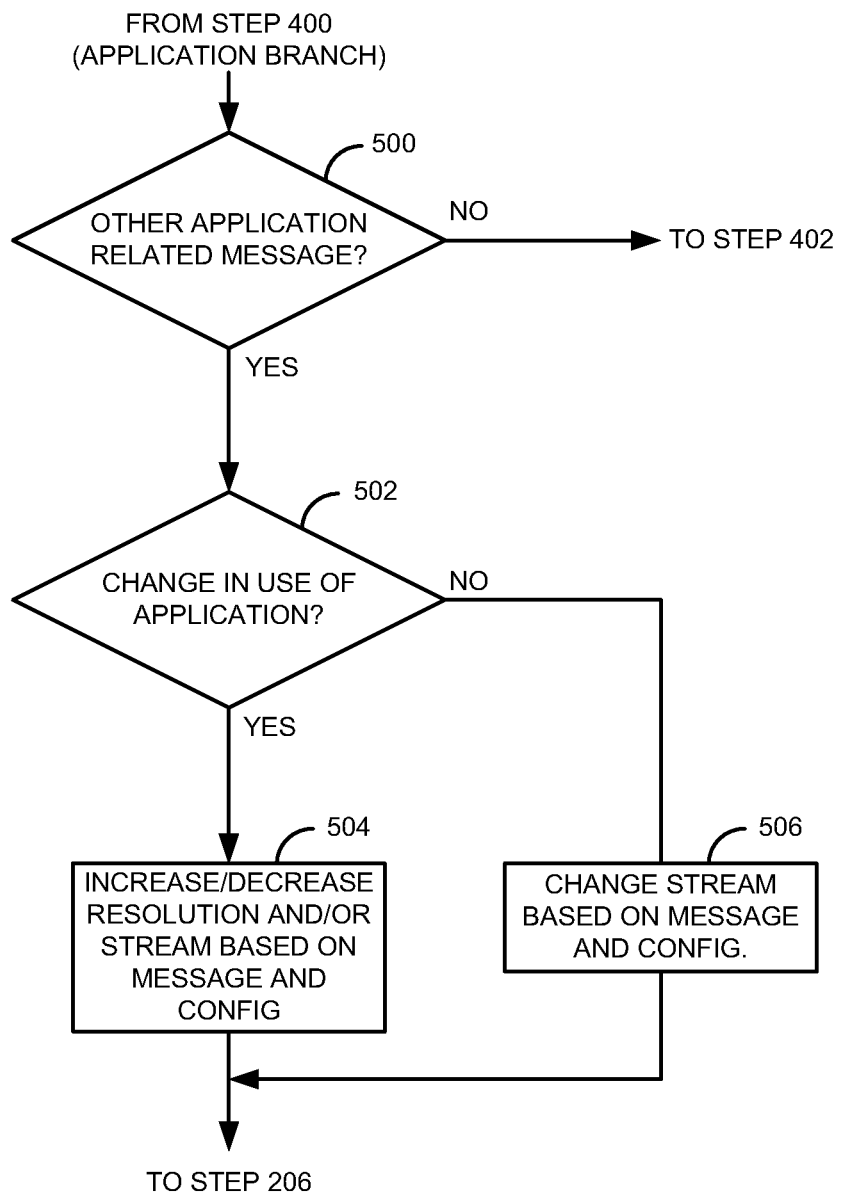
FIG. 5 is a flow diagram of a method for handling other focus-related messages.

FIG. 5 is a flow diagram of a method for handling other focus-related messages. The method of FIG. 5 is shown as going in between step 400 (application branch) and step 402. After determining that the message is application-related in step 400, the process determines in step 500 if the message is another application-related message. Other application-related messages can be, for example, where the user has stopped using application 114 for a specific period of time, and the like. If the message is not another application-related message in step 500, the process goes to step 402.

Otherwise, if the message is another application-related message in step 500, the process determines in step 502 if the message is a change in use message (e.g., the user has stopped typing and clicking in application window 141 for the last five seconds). If the message is a change of use message in step 502, codec 131 can increase or decrease 504 the resolution of the video portion of the stream of the active video conference based on configuration information 134. For example, if the message is that the user has stopped using application 114 by not clicking/typing for a period of time, codec 131 can increase the resolution of the stream of the active video conference from 480p to 720p in step 504. Once step 504 is completed the process goes to step 206.

If the message is not a change in use message in step 502, codec 131 changes 506 the stream of the active video conference based on configuration information 134. For example, if the message is that the user has changed his/her gaze from application window 141 to video conference window 140 (as observed by video camera 113), codec 131 can increase the video resolution of the active video conference in step 506. Likewise, if the message is that the user has changed his/her gaze from the video conference window 140 to the application window 141, codec 131 can lower the video resolution of the active video conference in step 506. Moreover, similar messages can be sent based on the user changing his/her gaze, such as the user looking (i.e., having a conversation) at another person in the room rather than participating in the video conference. After step 506 is completed the process goes to step 206.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated Figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   sending from a network interface a stream of an active video conference to a video terminal;
   receiving at the network interface a first message from the video terminal, wherein the first message was generated based on a user of the video terminal changing a focus of the user;
   changing in a codec, the stream of the active video conference based on the first message; and
   sending from the network interface, the changed stream of the active video conference to the video terminal.

2. The method of claim 1, wherein the change of the focus is resizing a window of an application, resizing a window of the active video conference, an initiation of a screen saver, or a termination of the screen saver.

3. The method of claim 2, wherein the changed stream of the active video conference is changed in the codec by lowering or increasing a video resolution of the stream of the active video conference.

4. The method of claim 1, further comprising:
   receiving a second message, wherein the second message was generated based on a lack of use in an application or a change in gaze of the user; and
   changing in the codec the video resolution of the stream of the active video conference based on the second message.

5. The method of claim 1, wherein the change of the focus is that the user has minimized a video conference window or an application window is now completely covering the video conference window, the stream of the active video conference comprises a video portion and an audio portion, and the changed stream of the active video conference is changed by the codec by not sending the video portion of the stream of the active video conference.

6. The method of claim 5, wherein the change of focus is that video conference window was minimized and further comprising the steps of:
   detecting by the video conference application that the video conference window was maximized; and
   sending by the codec the video portion of the active video conference based on the maximizing of the video conference window.

7. The method of claim 5, further comprising the step of sending one or more keep-alive messages.

8. The method of claim 1 wherein the change of the focus is moving a window of an application.

9. The method of claim 1, wherein the stream of the active video conference is a multi-layered bit stream and the step of changing the stream of the active video conference comprises stripping off or adding back one or more layers of the multi-layered bit stream.

10. A method comprising:
    receiving at a video terminal, a stream of an active video conference from a video conference bridge;
    displaying in a display, the stream of the active video conference in a video conference window; detecting by the video terminal, a change of a focus of the user;
    sending from the video terminal, a message based on the change of the focus to the video conference bridge;
    receiving at the video terminal, a changed stream of the active video conference from the video conference bridge, wherein the changed stream of the active video conference is changed based on the message; and
    displaying in the display, the changed stream of the active video conference in the video conference window.

11. A system comprising:
    a network interface configured to send a stream of an active video conference to a video terminal, receive a first message from the video terminal, wherein the first message was generated based on a user of the video terminal changing a focus of the user, and send a changed stream of the active video conference to the video terminal; and
    a codec configured to change the stream of the active video conference based on the first message.

12. The system of claim 11, wherein the change of the focus is resizing a window of an application, resizing a window of the active video conference, an initiation of a screen saver, or a termination of the screen saver.

13. The system of claim 12, wherein the changed stream of the active video conference is changed in the codec by lowering or increasing a video resolution of the stream of the active video conference.

14. The system of claim 11, wherein the network interface is further configured to receive a second message, wherein the second message was generated based on a lack of use in an application or a change of gaze of the user, and the codec is further configured to change the video resolution of the stream of the active video conference based on the second message.

15. The system of claim 11, wherein the change of the focus is that the user has minimized a video conference window or an application window is now completely covering the video conference window, the stream of the active video conference comprises a video portion and an audio portion, and the codec is further configured to change the stream of the active video conference by not sending the video portion of the stream of the active video conference.

16. The system of claim 15, wherein the video conference window was minimized, the video conference application is configured to detect that the video conference window is maximized, and the codec is configured to send the video portion of the active video conference based on the maximizing of the video conference window.

17. The system of claim 15, wherein the network interface is further configured to send one or more keep-alive messages.

18. The system of claim 11, wherein the change of the focus is moving a window of an application.

19. The method of claim 11, wherein the stream of the active video conference is a multi-layered bit stream and the codec is further configured to change the stream of the active video conference by stripping off or adding back one or more layers of the multi-layered bit stream.

20. A system comprising:
a video terminal configured to receive a stream of an active video conference from a video conference bridge, detect a change of a focus of a user, send a message based on the change of the focus to the video conference bridge, receive a changed stream of the active video conference from the video conference bridge, wherein the changed stream of the active video conference is changed based on the message; and
a display configured to display the stream of the active video conference in a video conference window to a user and display the changed stream of the active video conference in the video conference window.

* * * * *